United States Patent [19]
Hettinga

[11] Patent Number: 5,968,440
[45] Date of Patent: Oct. 19, 1999

[54] INJECTION MOLDED PLASTIC ARTICLE AND METHOD OF MOLDING SAME

[76] Inventor: Siebolt Hettinga, 2123 NW. 111th St., Des Moines, Iowa 50325

[21] Appl. No.: 08/714,569

[22] Filed: Sep. 16, 1996

[51] Int. Cl.⁶ ..................................................... B29B 7/00
[52] U.S. Cl. .......................... 264/328.1; 428/31; 428/46; 428/174; 428/187; 428/208; 428/328; 428/421; 428/422; 428/515; 428/908.8; 264/255; 264/254; 264/266; 264/297.8; 264/328.14
[58] Field of Search ................. 428/46, 31, 174, 428/187, 208, 328, 421, 422, 515, 520, 908.8; 264/255, 510, 259, 266, 328.1, 328.14, 334, 297.2, 297.8

[56] References Cited

U.S. PATENT DOCUMENTS

| | | | |
|---|---|---|---|
| 5,422,059 | 6/1995 | Hettinga | 264/328.1 |
| 5,429,786 | 7/1995 | Jogan et al. | 264/255 |

*Primary Examiner*—William Krynski
*Assistant Examiner*—Abraham Bahta
*Attorney, Agent, or Firm*—Brian J. Laurenzo; Michael C. Gilchrist

[57] ABSTRACT

A plastic article and method of molding same is provided where the plastic article includes a plastic member having a first ridge and a second ridge. The plastic member is partially absorbed into and is in bonded engagement with at least a portion of a first laminate and the first laminate has an edge imbedded in the first ridge of the plastic member. Also, the plastic member is partially absorbed into and is in bonded engagement with at least a portion of a second laminate and the second laminate has a first edge imbedded in the first ridge of the plastic member and a second edge imbedded in the second ridge of the plastic member. The plastic member is also partially absorbed into and is in bonded engagement with at least a portion of a third laminate and the third laminate has an edge imbedded in the second ridge of the plastic member.

24 Claims, 7 Drawing Sheets

FIG. 13

INJECTION MOLDED PLASTIC ARTICLE AND METHOD OF MOLDING SAME

BACKGROUND OF THE INVENTION

The invention relates generally to a method of injection molding a plastic article, and more particularly to a method of injection molding a plastic article where edges of a first and second laminate are positioned over a recess of a first mold section and a protrusion of a second mold section pushes the edges into the recess upon the first mold section and the second mold section being clamped together.

The invention also relates generally to an injection molded plastic article, and more particularly to an injection molded plastic article including a plastic member having a ridge, wherein a first portion of the plastic member is partially absorbed into and is in bonded engagement with at least a portion of a first laminate which has an edge imbedded in the ridge, and a second portion of the plastic member is partially absorbed into and is in bonded engagement with at least a portion of a second laminate which has an edge also imbedded in the ridge.

In the past, it has not been possible, within an injection molding process, to provide that laminates such as textile, film, carpet or vinyl are bonded to a plastic member having a ridge where edges of the laminates are imbedded in the ridge. Instead, first a plastic member is typically molded using conventional plastic injection molding techniques wherein a first mold section and a second mold section are provided. Then, the first mold section and the second mold section are clamped together to form a mold cavity therebetween, and preferably the mold cavity is shaped such that the resulting plastic member will have a ridge. Next, a plastic material is injected into the mold cavity, and the plastic material is allowed to at least partially cure before the first mold section and the second mold section are unclamped and the resulting plastic member is removed from the mold cavity. As mentioned, if the mold cavity is shaped as such, the resulting molded plastic member will have a ridge.

After the resulting plastic member is removed from the mold cavity, the laminates are typically stitched, glued, sewn, or otherwise secured onto the molded plastic member, and the edges of the laminates are likewise stitched, glued, sewn, or otherwise secured into the ridge. As a result of the laminates being added as a secondary operation, the laminates generally are not bonded extremely securely to the molded plastic member. Furthermore, because the edges of the laminates are bonded into the ridge as an operation secondary to the molding of the plastic article, the edges of the laminates are not typically secured into the ridge extremely securely and are certainly not truly imbedded into the ridge. As a result, the edges of the laminates may readily remove from the ridge of the plastic member when a load is applied to the article. Obviously, this removal of an edge of a laminate from the ridge of the plastic member would likely diminish the aesthetic appearance of the article in general, and would likely increase the probability that the laminate will further remove from the plastic member upon subsequent application of another load to the article.

The difficulties discussed hereinabove are substantially eliminated by the present invention.

SUMMARY OF THE INVENTION

Accordingly, it is an object of the present invention to provide a method of injection molding a plastic article where laminates are bonded to a plastic member and edges of the laminates are truly imbedded in a ridge of the plastic member within an injection molding process.

Another object of the present invention is to provide an injection molded plastic article including a plastic member having a ridge where laminates are bonded to the plastic member and edges of the laminates are truly imbedded in the ridge of the plastic member.

A further object of the present invention is to provide a method of injection molding a plastic article where edges of laminates are embedded extremely securely in a ridge of a plastic member within an injection molding process.

Still another object of the present invention is to provide an injection molded plastic article which includes edges of laminates embedded extremely securely in a ridge of a plastic member such that the edges will not become removed from the ridge upon application of a load to the injection molded plastic article.

Other features and advantages of the present invention will become apparent from a review of the following description, drawings, and claims.

By the present invention, it is proposed to overcome the difficulties encountered heretofore. To this end, a method is provided wherein a first mold section having a recess and a second mold section having a protrusion are provided, a first laminate having an edge and a second laminate having an edge are provided and the edges are positioned over the recess, the mold sections are clamped to form a mold cavity. The clamping causes the protrusion to be received in the recess and causes the protrusion to push the edges of the first and second laminates into the recess. After the mold sections are clamped to form the mold cavity, a plastic material is injected into the mold cavity and the plastic material contacts and becomes partially absorbed into at least a portion of the first laminate and the second laminate. While the plastic material is allowed to at least partially cure, the plastic material bonds to the first and second laminates. Then, the mold sections are unclamped and the resulting molded plastic article is removed from the mold cavity.

In a preferred method, a first mold section having a first recess and a second recess is provided, a second mold section having a first protrusion and a second protrusion is provided, a first laminate having an edge is provided, a second laminate having a first edge and a second edge is provided, and a third laminate having an edge is provided. The first edge of the second laminate is positioned over the first recess and the second edge of the second laminate is positioned over the second recess, the edge of the first laminate is positioned over the first edge of the second laminate and the first recess, and the edge of the third laminate is positioned over the second edge of the second laminate and the second recess. Then, the mold sections are clamped together to form a mold cavity and the clamping causes the first protrusion to be received in the first recess and causes the first protrusion to push the edge of the first laminate and the first edge of the second laminates into the first recess. The clamping of the mold sections also causes the second protrusion to be received in the second recess and causes the second protrusion to push the edge of the third laminate and the second edge of the second laminates into the second recess. Next, a plastic material is injected into the mold cavity and the plastic material contacts and becomes partially absorbed into at least a portion each of the first, second and third laminates and the injection causes the first, second and third laminates to press against the second mold section. The injection also causes the edge of the first laminate and the first edge of the second laminate to press against the first protrusion such that the first edge of the second laminate and the edge of the first laminate no longer overlap, and causes the edge of the third laminate and the second edge of the second laminate to press against the second protrusion such that the edge of the third laminate and the second edge of the second laminate no longer overlap. Then, the plastic material is allowed to at least partially cure and the plastic material bonds to the first, second and third laminates. Finally, the mold sections are unclamped and the resulting molded plastic article is removed from the mold cavity.

An injection molded plastic article is also provided where the article comprises a plastic member having a ridge, the plastic member is partially absorbed into and is in bonded engagement with at least a portion of a first laminate and the first laminate has an edge imbedded in the ridge of the plastic member. Likewise, the plastic member is partially absorbed into and is in bonded engagement with at least a portion of a second laminate and the second laminate has an edge imbedded in the ridge of the plastic member.

In a preferred injection molded plastic article, the article comprises a plastic member having a first ridge and a second ridge, the plastic member is partially absorbed into and is in bonded engagement with at least a portion of a first laminate and the first laminate has an edge imbedded in the first ridge of the plastic member. Also, the plastic member is partially absorbed into and is in bonded engagement with at least a portion of a second laminate and the second laminate has a first edge imbedded in the first ridge of the plastic member and a second edge imbedded in the second ridge of the plastic member. The plastic member is also partially absorbed into and is in bonded engagement with at least a portion of a third laminate and the third laminate has an edge imbedded in the second ridge of the plastic member. Preferably, the edge of the first laminate does not overlap with the first edge of the second laminate in the first ridge, and the edge of the third laminate does not overlap with the second edge of the second laminate in the second ridge.

DETAILED DESCRIPTION OF THE INVENTION

Figure 1:
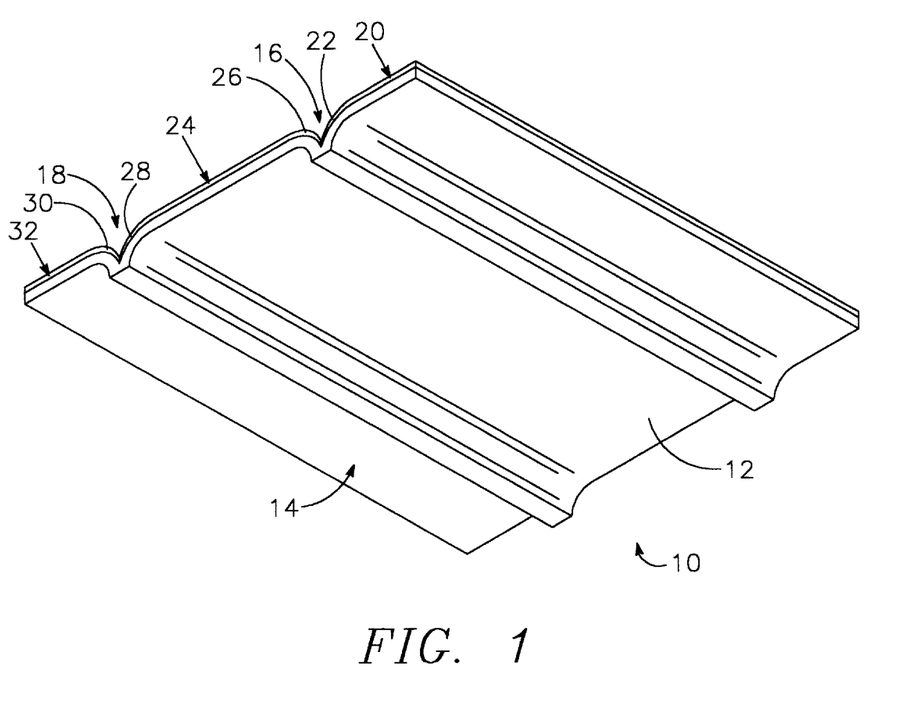
FIG. 1 is a perspective view of a plastic article in accordance with the present invention.

Shown in FIG. 1 is a plastic article 10 including a plastic member 12. The plastic member 12 may be comprised of any of a number of different types of plastic, and the present invention is not limited by the type of material used. The plastic member 12 has a side 14, and on the side 14 of the plastic member 12 is a first ridge 16 and a second ridge 18. The plastic member 12 is partially absorbed into and is in bonded engagement with a first laminate 20. The first laminate 20 may be any type of laminate including textile, film, carpet or vinyl. The first laminate 20 has an edge 22, and the edge 22 is imbedded in the first ridge 16 on the side 14 of the plastic member 12.

Likewise, the plastic member 12 is partially absorbed into and is in bonded engagement with a second laminate 24. The second laminate 24 may also be any type of laminate including textile, film, carpet or vinyl. The second laminate 24 has a first edge 26 and a second edge 28, and the first edge 26 of the second laminate 24 is imbedded in the first ridge 16 on the side 14 of the plastic member 12 along with the edge 22 of the first laminate 20. Preferably, the edge 22 of the first laminate 20 and the first edge 26 of the second laminate 24 do not overlap in the first ridge 16. However, it is certainly anticipated that the edge 22 of the first laminate 20 and the first edge 26 of the second laminate 24 may, in fact, overlap in the first ridge 16. The second edge 28 of the second laminate 24 is imbedded in the second ridge 18 on the side 14 of the plastic member 12 along with an edge 30 of a third laminate 32. The third laminate 32 may also be any type of laminate including textile, film, carpet and vinyl. Much like the first laminate 20 and the second laminate 24, the plastic member 12 is partially absorbed into and is in bonded engagement with the third laminate 32. Preferably, the edge 30 of the third laminate 32 and the second edge 28 of the second laminate 24 do not overlap in the second ridge 18. However, it is certainly anticipated that the edge 30 of the third laminate 32 and the second edge 28 of the second laminate 24 may, in fact, overlap in the second ridge 18.

Figure 10:
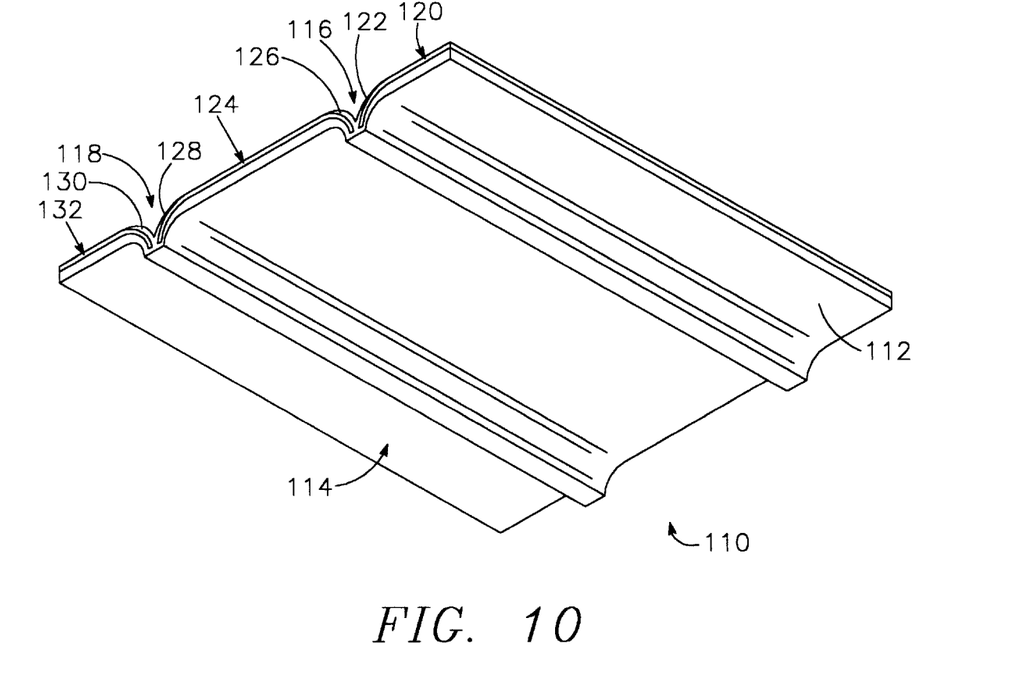
FIG. 10 is a perspective view of a plastic article in accordance with an alternative embodiment of the present invention.

As shown in FIG. 1, preferably the edges 22, 26, 28 and 30 of the laminates 20, 24 and 32 are imbedded in the ridges 16 and 18 of the plastic member 12, but are not imbedded in the plastic member 12 itself Alternatively, as shown in FIG. 10, a plastic article 110 can be provided such that the edges 122, 126, 128 and 130 of the laminates 120, 124 and 132 are porous and are not only imbedded in a first ridge 116 and second ridge 118, but are truly imbedded in a plastic member 112 as well.

To provide the plastic article 10 shown in FIG. 1, it is possible to utilize the following described plastic injection molding process using the molding apparatus disclosed in U.S. Pat. No. 5,422,059, and the disclosure of this patent is included herein by reference. One skilled in the art should recognize that it is not imperative that the molding apparatus disclosed in U.S. Pat. No. 5,422,059 be used to practice the invention, and that it is possible to use a more standard molding apparatus which does not include a film gate. However, the molding apparatus as disclosed in U.S. Pat. No. 5,422,059 will now be discussed in connection with the present invention.

Figure 3:
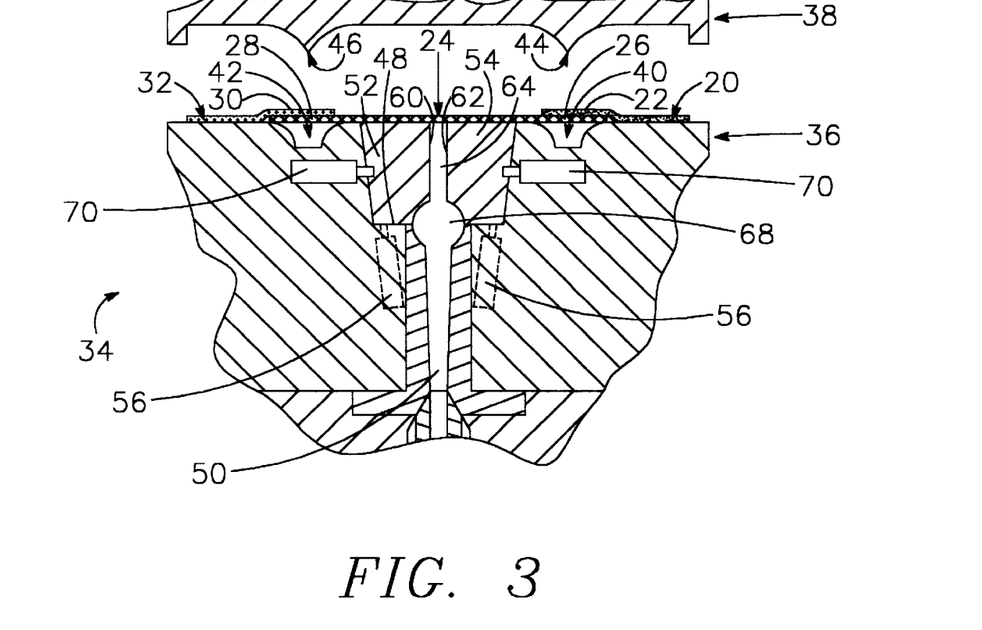
FIG. 3 is a side elevational, cross-sectional view of the mold unit of FIG. 2 showing a first laminate, a second laminate and a third laminate positioned on the first mold section.
Figure 4:
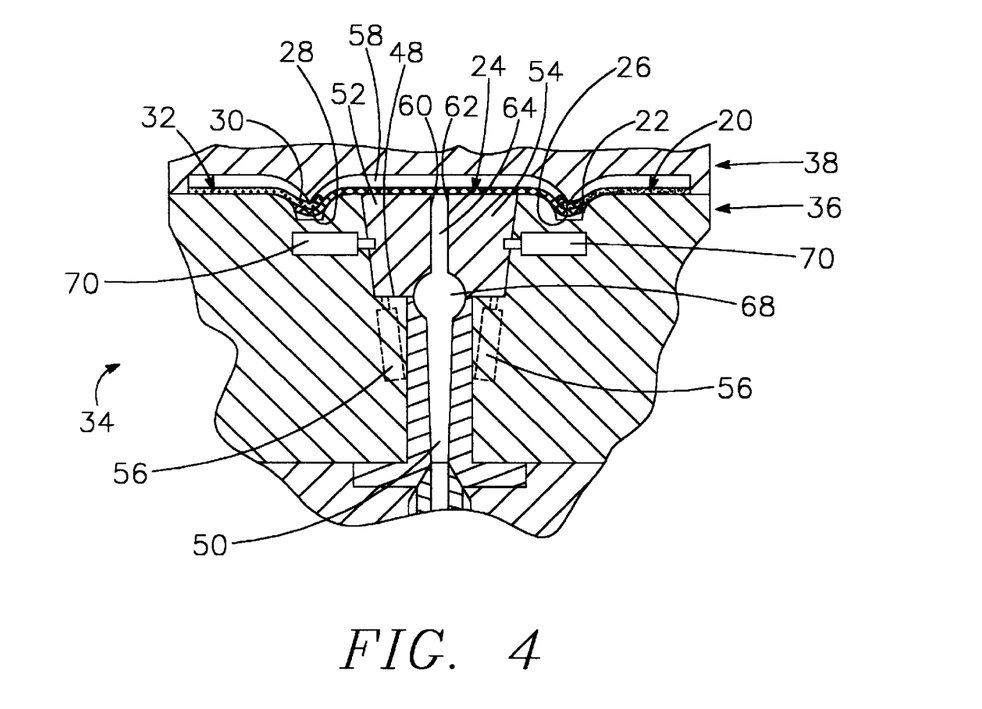
FIG. 4 is a side elevational, cross-sectional view of the mold unit of FIG. 3 showing the mold unit in the closed position after the first laminate, second laminate and third laminate had been positioned on the first mold section.
Figure 5:
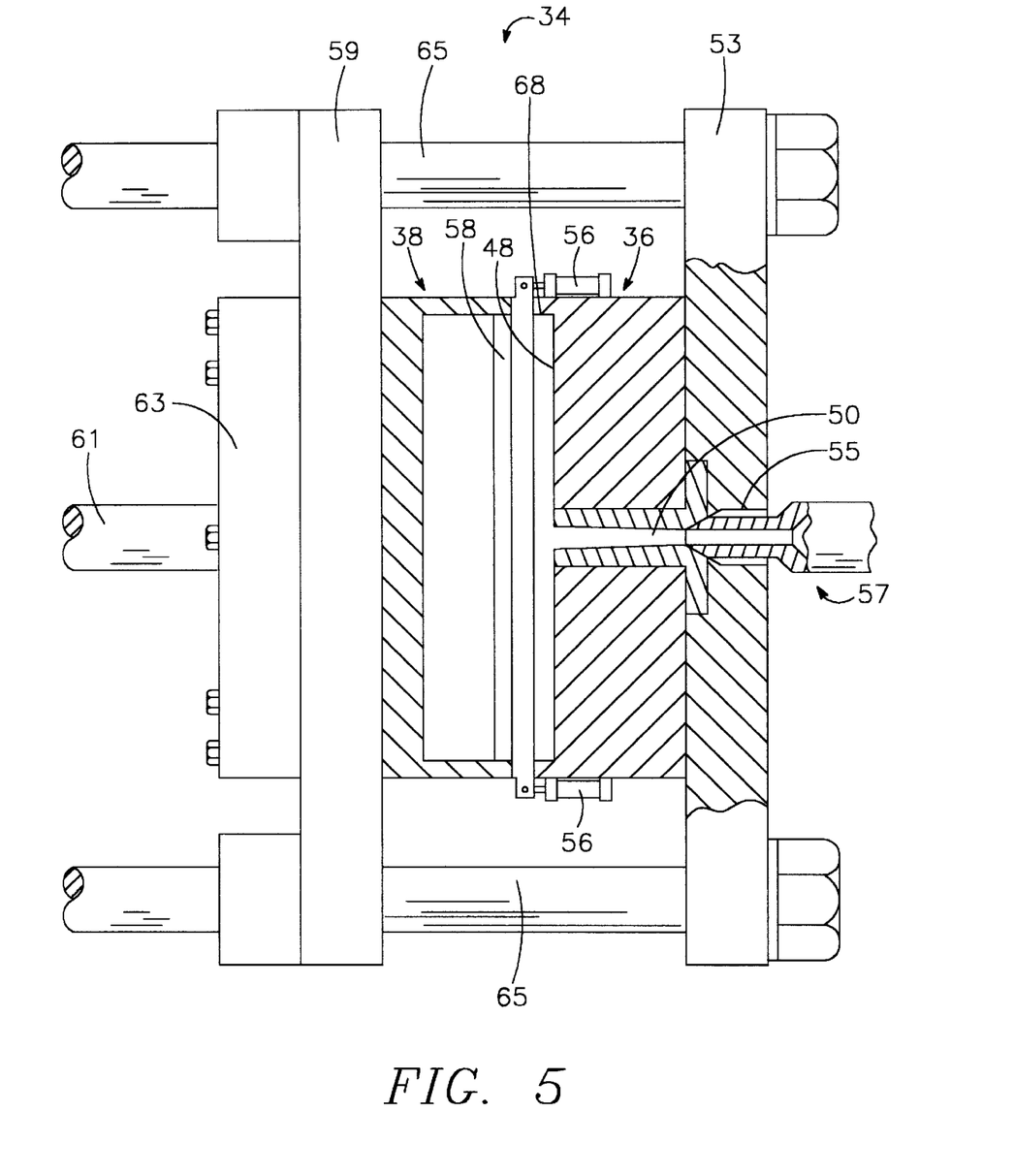
FIG. 5 is a front cutaway view of the mold unit of FIGS. 4 showing hydraulic pistons on each side of the mold unit and attached to a tenon member.

As shown in FIGS. 2–8, a mold unit 34 is provided wherein the mold unit 34 includes a first mold section 36 and a second mold section 38. The first mold section 36 has a first recess 40 and a second recess 42. The second mold section 38 has a first protrusion 44 and a second protrusion 46. The first mold section 36 is also grooved with a mortise 48 and has a sprue 50 located in a generally central location with respect to the mortise 48. Two tenon members 52 and 54 are provided which can be moved into and out of dovetail engagement with the mortise 48. As shown most clearly in FIG. 5, the tenon members 52 and 54 extend beyond the sides of the first mold section 36 and second mold section 38 so that the tenon members 52 and 54 may be mounted to hydraulic pistons 56 which move the tenon members 52 and 54 into and out of engagement with the mortise 48. As shown, the hydraulic pistons 56 may be mounted to the first mold section 36. As also shown in FIG. 5, the first mold section 36 is typically clamped to a stationary plate 53 with an inlet 55 for receiving an injection nozzle 57. The second mold section 38 is typically clamped to a moveable plate 59, and a ram 61 moves the moveable plate by way of a connecting platen 63. The stationary plate 53 is secured to tie bars 65, and it is along the tie bars 65 which the moveable plate 59 moves.

Figure 6:
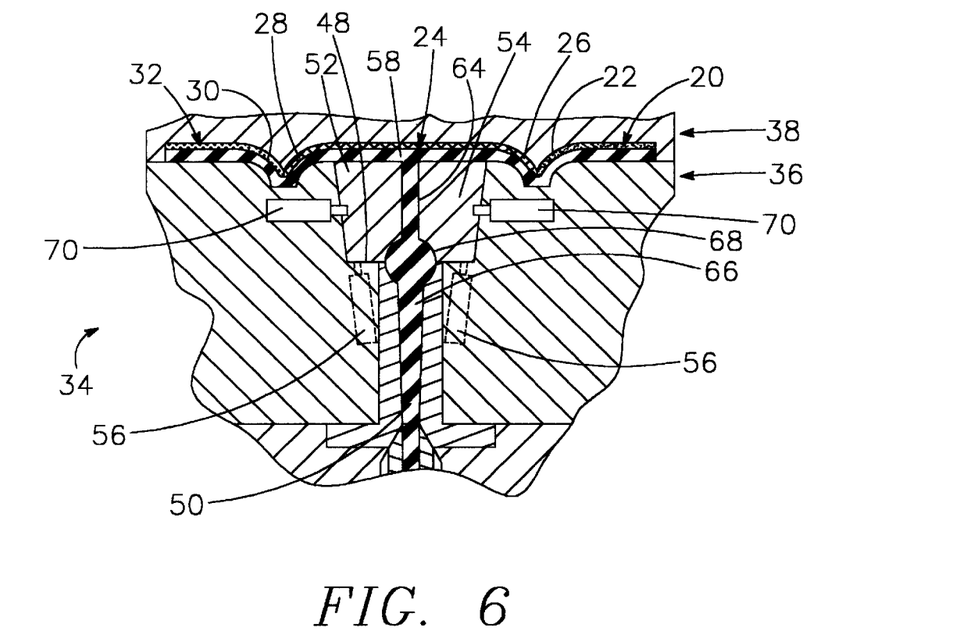
FIG. 6 is a side elevational, cross-sectional view of the mold unit of FIG. 4 showing the mold unit in the closed position after a plastic material has been injected into a mold cavity.

As shown in FIG. 3, when the first mold section 36 is not clamped with the second mold section 38, it is possible to position the first laminate 20, the second laminate 24 and the third laminate 32 on the first mold section 36. As shown in FIGS. 4 and 6, when the first mold section 36 is clamped with the second mold section 38, a mold cavity 58 is formed. When the first mold section 36 is clamped with the second mold section 38, the first protrusion 44 of the second mold section 38 is received in the first recess 40 of the first mold section 36. Likewise, when the first mold section 36 is clamped with the second mold section 38, the second protrusion 46 of the second mold section 38 is received in the second recess 42 of the first mold section 36. The sides 60 and 62 of the tenon members 52 and 54 which face each other are tooled to form a film gate 64 so that an injection material 66 may be injected along the sprue through the film gate 64 and into the mold cavity 58. The tenon members 52 and 54 are concavely cambered along the film gate 64, and the first and second mold sections 36 and 38 are tooled with an incurve so that a cylindrical hollow area 68 is formed when the tenon members 52 and 54 are pulled into engagement with the mortise 48. The cylindrical hollow area 68 acts as a runner, and preferably the injected plastic material 66 disburses along the cylindrical hollow area 68 before flowing into the film gate 64 and then into the mold cavity 58.

Figure 2:
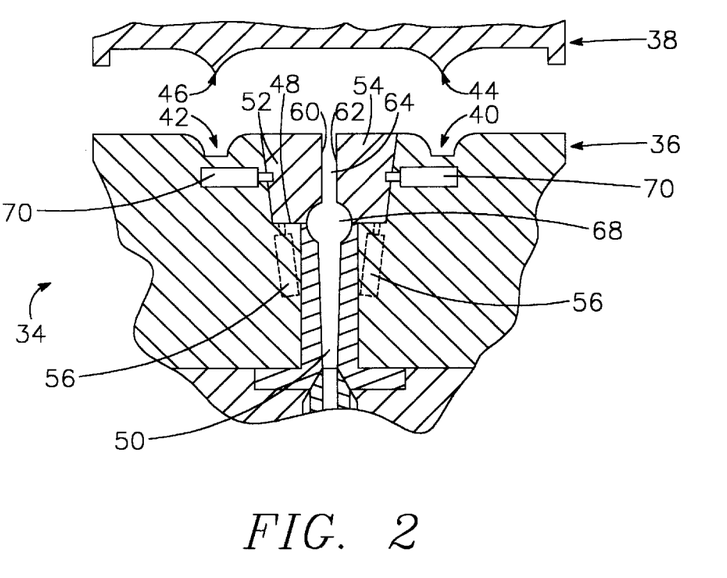
FIG. 2 is a side elevational, cross-sectional view of a mold unit in an open position showing a film gate closed and a side lock holding a tenon member in securement to a first mold section.

When beginning the molding process, as shown in FIG. 2, the first mold section 36 and the second mold section 38 are in an unclamped position, and the hydraulic pistons 56 have the tenon members 52 and 54 pulled into engagement with the mortise 48. Lock rams 70 are engaged to hold the tenon members 52 and 54 in place. The second laminate 24 is positioned on the first mold section 36 such that the first edge 26 of the second laminate 24 is positioned over the first recess 40 of the first mold section 36 and the second edge 28 of the second laminate 24 is positioned over the second recess 42 of the first mold section 36. The first laminate 20 is positioned on the first mold section 36 such that the edge 22 of the first laminate 20 is also positioned over the first recess 40. Preferably, the edge 22 of the first laminate 20 is also positioned over the first edge 26 of the second laminate 24 such that the edge 22 of the first laminate 20 overlaps the first edge 26 of the second laminate 24 over the first recess 40. However, the first laminate 20 and second laminate 24 may be positioned on the first mold section 36 such that the first edge 26 of the second laminate 24 is over the edge 22 of the first laminate 20. Alternatively, the edge 22 of the first laminate 20 and the first edge 26 of the second laminate 24 may not overlap at all. Likewise, the third laminate 32 is positioned on the first mold section 36 such that the edge 30 of the third laminate 32 is positioned over the second recess 42, and preferably, the edge 30 of the third laminate 32 is also positioned over the second edge 28 of the second laminate 24 such that the edge 30 of the third laminate 32 overlaps the second edge 28 of the second laminate 24 over the second recess 42. However, the third laminate 32 and second laminate 24 may be positioned on the first mold section 36 such that the second edge 28 of the second laminate 24 is over the edge 30 of the third laminate 32. Alternatively, the edge 22 of the first laminate 20 and the second edge 28 of the second laminate 24 may not overlap at all. Within the process, the first laminate 20, second laminate 24 and third laminate 32 may be practically any type of laminate including textile, film, carpet or vinyl.

After the first laminate 20, the second laminate 24 and the third laminate 32 are positioned against the first mold section 36, the first mold section 36 is clamped with the second mold section 38 to form the mold cavity 58 as shown in FIG. 4. When the first mold section 36 and the second mold section 38 are clamped together, the first protrusion 44 of the second mold section 38 is received in the first recess 40 of the first mold section 36. Likewise, the second protrusion 46 of the second mold section 38 is received in the second recess 42 of the first mold section 36. When the first protrusion 44 is received in the first recess 40, the first protrusion 44 pushes the edge 22 of the first laminate 20 and the first edge 26 of the second laminate 24 into the first recess 40. Also, when the second protrusion 46 is received in the second recess 42, the second protrusion 46 pushes the edge 30 of the third laminate 32 and the second edge 28 of the second laminate 24 into the second recess 42.

Then, as shown in FIG. 6, a plastic material 66 is injected through the sprue 50 into the cylindrical hollow area 68, and pressure is maintained upon the plastic material 66 until the cylindrical hollow area 68 is filled and the plastic material 66 begins to pass through the film gate 64 into the mold cavity 58. Pressure is maintained upon the plastic material 66 while the mold cavity 58 is filled. As shown, preferably the injection of the plastic material 66 causes the first laminate 20, the second laminate 24 and the third laminate 32 to press against the second mold section 38. Additionally, preferably the injection of the plastic material 66 causes the edge 22 of the first laminate 20 and the first edge 26 of the second laminate 24 to press against the first protrusion 44 causing the edge 22 of the first laminate 20 to no longer overlap with the first edge 26 of the second laminate 24. Likewise, preferably the injection of the plastic material 66 causes the edge 30 of the third laminate 32 and the second edge 28 of the second laminate 24 to press against the second protrusion 46 causing the edge 30 of the third laminate 32 to no longer overlap with the second edge 28 of the second laminate 24. When the plastic material 66 is injected into the mold cavity 58, the plastic material 66 becomes partially absorbed into the first laminate 20, second laminate 24 and third laminate 32.

Figure 7:
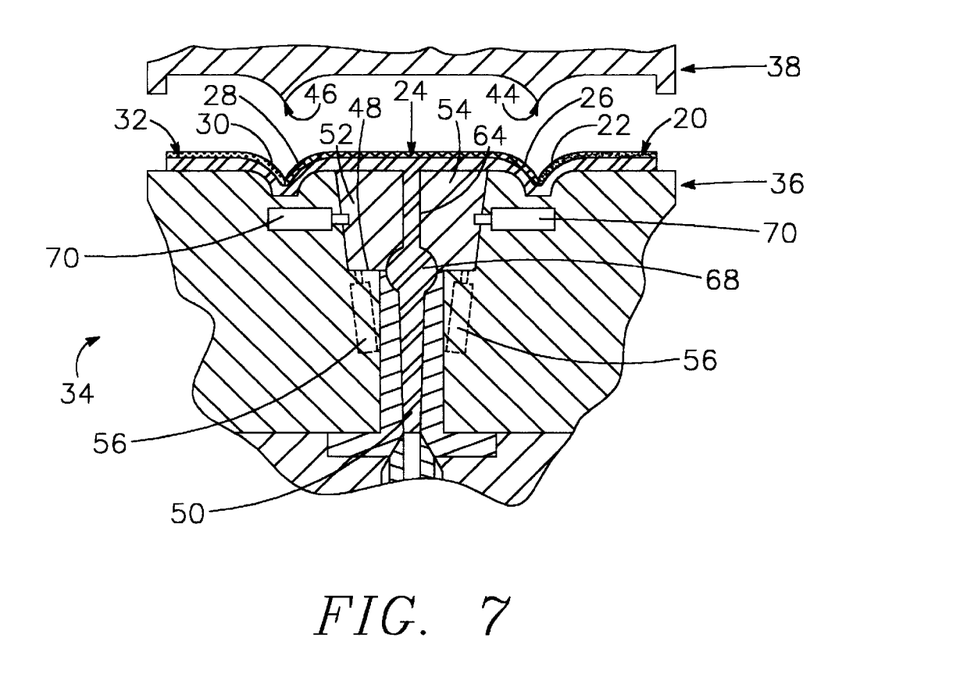
FIG. 7 is a side elevational, cross-sectional view of the mold unit of FIGS. 6 showing the mold unit in the open position after the plastic material had been injected into the mold cavity.
Figure 8:
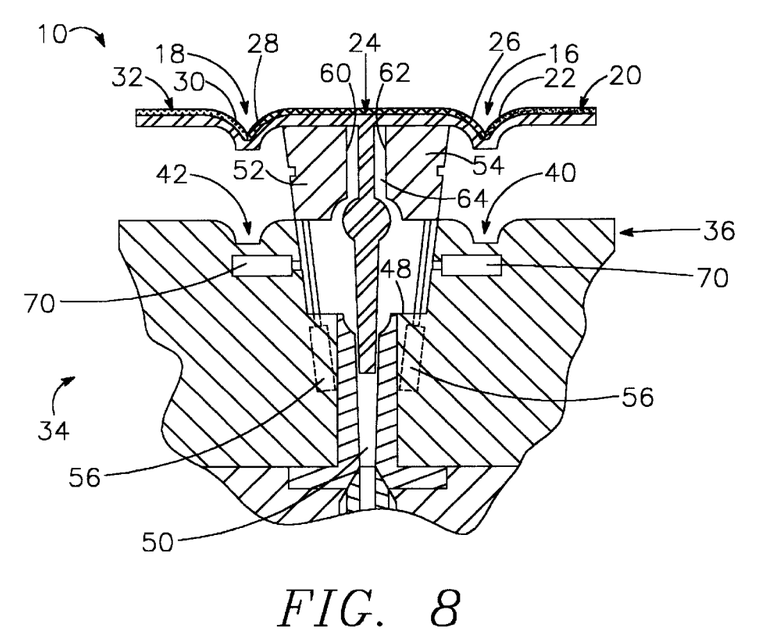
FIG. 8 is a side elevational, cross-sectional view of the mold unit of FIGS. 7 showing the mold unit in the open position after the plastic material had been injected into the mold cavity and after the film gate has been opened.

Pressure is maintained on the plastic material 66 until the plastic material 66 at least partially cures. As the plastic material 66 at least partially cures in the mold cavity 58, the plastic material 66 bonds to the first laminate 20, the second laminate 24 and the third laminate 32. After the plastic material 66 at least partially cures, the first mold section 36 and the second mold section 38 are unclamped and pulled apart as shown in FIG. 7. As shown in FIG. 8, the hydraulic pistons 56 then extend the tenon members 52 and 54, and the tenon members 52 and 54 eject the resulting molded plastic article 10 from the mold cavity 58 so that the resulting molded plastic article 10 can be easily removed. After the resulting plastic article 10 is removed from the mold cavity 58, the hydraulic pistons 56 pull the tenon members 52 and 54 back into a dovetail engagement with the mortise 48 of the first mold section 36 so that the molding process may be repeated.

Figure 9:
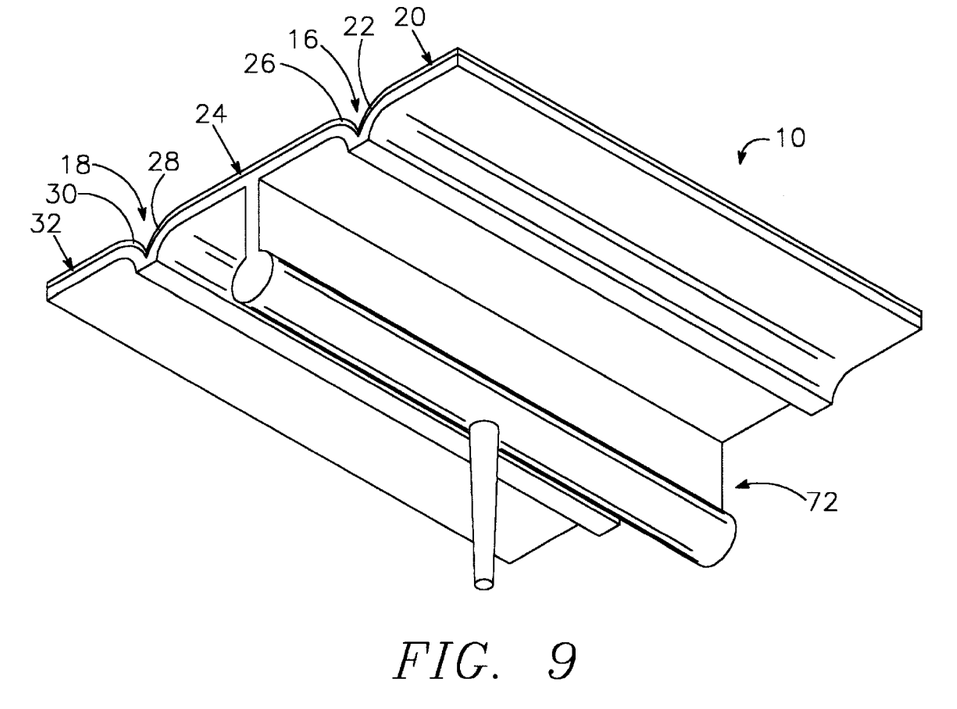
FIG. 9 is a perspective view of a resulting molded plastic article after it has been removed from the mold cavity.

After the resulting molded plastic article 10 is removed from the mold cavity 58, the resulting plastic article 10 appears as shown in FIG. 9. As shown, the resulting molded plastic article 10 includes a dross 72, but the dross 72 may be easily broken off to obtain the plastic article 10 shown in FIG. 1.

As shown in FIG. 1, preferably the edge 22 of the first laminate 20 and the first edge 26 of the second laminate 24 are imbedded in the first ridge 16 of the plastic member 12 but are not imbedded in the plastic member 12 itself, and the edge 30 of the third laminate 32 and the second edge 28 of the second laminate 24 are imbedded in the second ridge 18 of the plastic member 12 but are not imbedded in the plastic member 12 itself. However, as mentioned, it is also possible to provide a plastic article 110 such as that which is shown in FIG. 10 where edges 122, 126, 128 and 130 of laminates 120, 124 and 132 are truly imbedded in a plastic member 112 as well as in a first ridge 116 and a second ridge 118 on the plastic member 112. As shown in FIG. 10, the plastic member 112 is partially absorbed into and is in bonded engagement with a first laminate 120 where the first laminate 120 has an edge 122, and the edge 122 is imbedded in the first ridge 116 on the side 114 of the plastic member 112 and is also imbedded in the plastic member 112 itself Likewise, the plastic member 112 is partially absorbed into and is in bonded engagement with a second laminate 124. The second laminate 124 has a first edge 126 and a second edge 128, and the first edge 126 of the second laminate 124 is imbedded in the first ridge 116 on the side 114 of the plastic member 112 and is also imbedded in the plastic member 112 itself The second edge 128 of the second laminate 124 is imbedded in the second ridge 118 on the side 114 of the plastic member 112 along with an edge 130 of a third laminate 132, and the second edge 128 of the second laminate 124 and the edge 130 of the third laminate 132 are also imbedded into the plastic member 112 itself Much like the first laminate 120 and the second laminate 124, the plastic member 112 is partially absorbed into and is in bonded engagement with the third laminate 132.

Figure 11:
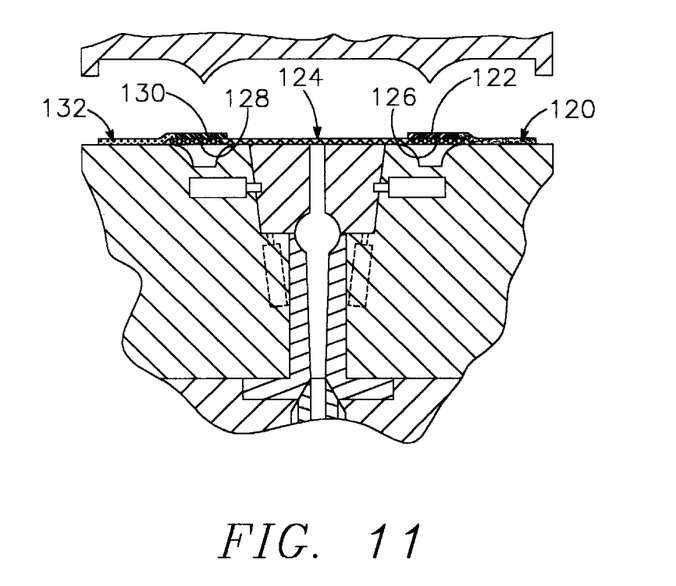
FIG. 11 is a side elevational, cross-sectional view of the mold unit of FIG. 2 showing a first laminate, a second laminate and a third laminate positioned on the first mold section where the edges of each laminate are porous.
Figure 12:
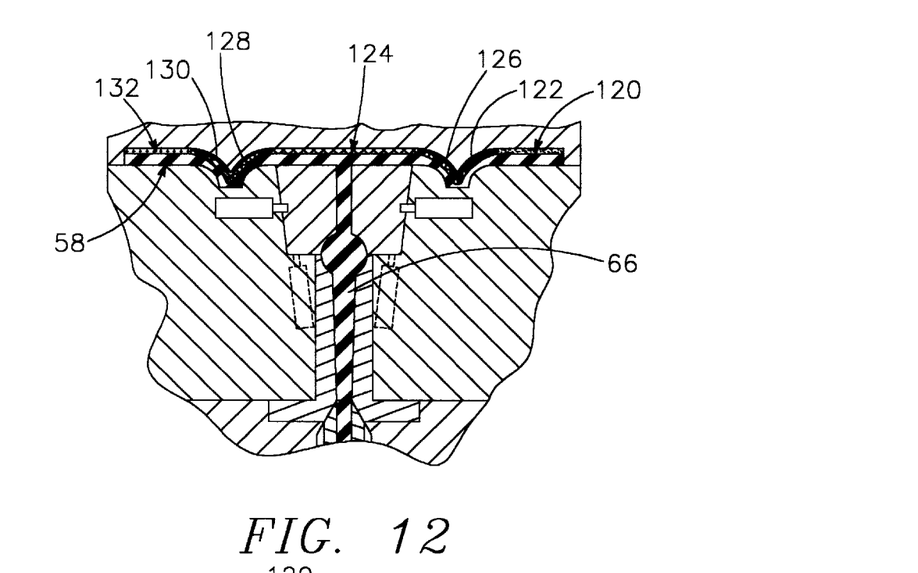
FIG. 12 is a side elevational, cross-sectional view of the mold unit of FIG. 11 showing the mold unit in the closed position after a plastic material has been injected into a mold cavity and showing the edges of each of the laminates imbedded in the plastic material.
Figure 13:
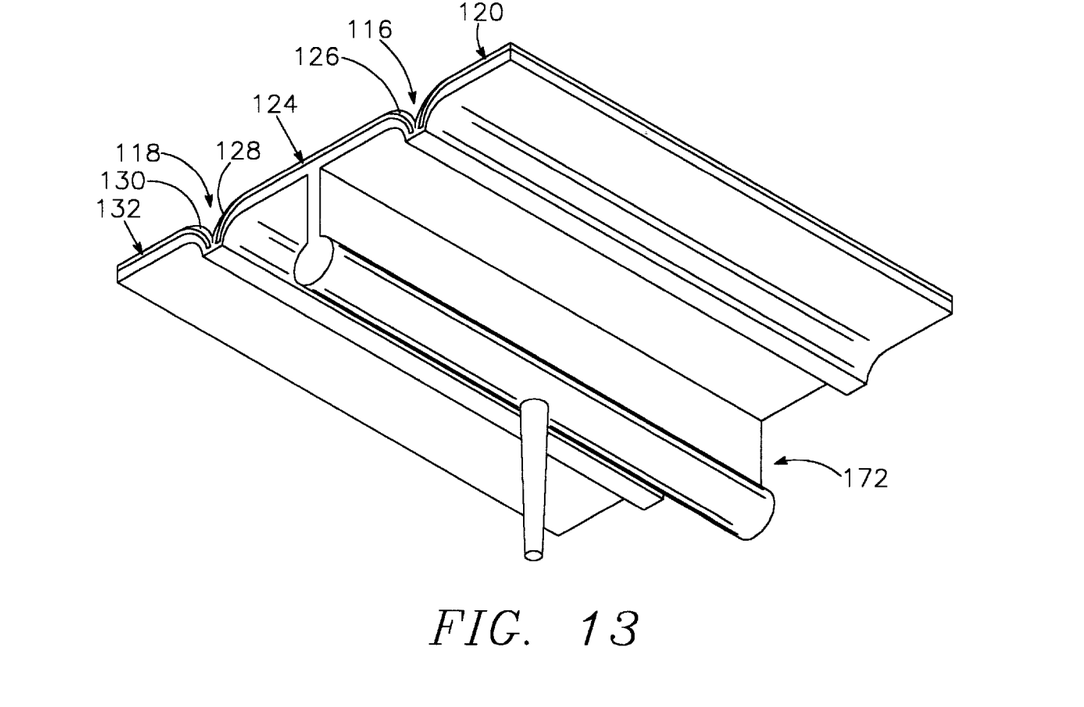
FIG. 13 is a perspective view of an alternative resulting molded plastic article after it has been removed from the mold cavity of FIG. 12.

To provide the plastic article 110 shown in FIG. 10, it is possible to utilize nearly the same plastic injection molding process which was described above to provide the plastic article 10 shown in FIG. 1. However, as shown in FIG. 11, the edge 122 of the first laminate 120, the first edge 126 and second edge 128 of the second laminate 124, and the edge 130 of the third laminate 132 are preferably porous. By providing that the edges 122, 126, 128 and 130 of the laminates 120, 124 and 132 are porous, the plastic material 66 which is injected into the mold cavity 58, as shown in FIG. 12, is able to flow through the edges 122, 126, 128 and 130 and the edges 122, 126, 128 and 130 therefore get imbedded within the plastic material 66. When the resulting plastic article 110 is removed from the mold cavity 58, the resulting plastic article 110 appears as shown in FIG. 13. The resulting plastic article 110 includes a dross 172, but the dross 172 can be easily removed to provide the plastic article 110 shown in FIG. 10 where the edges 122, 126, 128 and 130 of the laminates 120, 124 and 132 are not only imbedded into the ridges 116 and 118, but are also imbedded into the plastic member 112 itself.

The foregoing description and drawings merely explain and illustrate the invention, and the invention is not limited thereto, except insofar as the claims are so limited as those skilled in the art who have the disclosure before them will be able to make modifications and variations therein without departing from the scope of the invention. For example, it is anticipated that the first mold section and second mold section may have less than or more than two recesses and two protrusions, respectively. It is also anticipated that there may be less than or more than three laminates.

What is claimed is:

1. A method of injection molding a plastic article, said method comprising the steps of:
    a) providing a first mold section having a recess;
    b) providing a second mold section having a protrusion, said second mold section forming a mold cavity with said first mold section upon said second mold section being clamped with said first mold section, said protrusion of said second mold section receivable in said recess of said first mold section upon said second mold section being clamped with said first mold section;
    c) providing a first laminate having an edge;
    d) providing a second laminate having an edge;
    e) positioning said edge of said first laminate over said recess of said first mold section;
    f) positioning said edge of said second laminate over said recess of said first mold section;
    g) clamping said first mold section and said second mold section thereby forming said mold cavity, said clamping causing said protrusion of said second mold section to be received in said recess of said first mold section, said protrusion pushing said edge of said first laminate and said edge of said second laminate into said recess of said first mold section;
    h) injecting a plastic material into said mold cavity, said plastic material contacting and becoming partially absorbed into at least a portion of said first laminate upon said plastic material being injected into said mold cavity, said plastic material contacting and becoming partially absorbed into at least a portion of said second laminate upon said plastic material being injected into said mold cavity;
    i) allowing said plastic material to at least partially cure within said mold cavity, said plastic material bonding to said portion of said first laminate and said portion of said second laminate upon said plastic material at least partially curing;

j) unclamping said first mold section and said second mold section; and k) removing the resulting molded plastic article from said mold cavity.

2. The method according to claim 1, wherein said injection causes said first laminate and said second laminate to press against said second mold section, said injection also causing said edge of said first laminate and said edge of said second laminate to press against said protrusion of said second mold section.

3. The method according to claim 1, wherein said first laminate is a laminate selected from the group consisting of textile, film, carpet, and vinyl.

4. The method according to claim 1, wherein said second laminate is a laminate selected from the group consisting of textile, film, carpet, and vinyl.

5. The method according to claim 1, further comprising overlapping said edge of said first laminate and said edge of said second laminate upon positioning said edge of said first laminate and said edge of said second laminate over said recess of said first mold section.

6. The method according to claim 5, wherein said protrusion of said second mold section pushes said edge of said first laminate and said edge of said second laminate upon clamping of said first mold section and said second mold section such that said edge of said first laminate and said edge of said second laminate no longer overlap.

7. The method according to claim 1, wherein said first mold section has a second recess, wherein said second mold section has a second protrusion, wherein said second laminate has a second edge, and wherein said method for injection molding a plastic part further comprises:

a) providing a third laminate having an edge; and b) positioning said edge of said third laminate over said second recess of said first mold section, wherein said clamping of said first mold section and said second mold section causes said second protrusion of said second mold section to be received in said second recess of said first mold section, said second protrusion pushing said second edge of said second laminate and said edge of said third laminate into said second recess of said first mold section, wherein said plastic material contacts and becomes partially absorbed into at least a portion of said third laminate upon said plastic material being injected into said mold cavity, and wherein said plastic material bonds to said portion of said third laminate upon said plastic material at least partially curing.

8. The method according to claim 7, wherein said injection causes said second laminate and said third laminate to press against said second mold section, said injection also causing said second edge of said second laminate and said edge of said third laminate to press against said second protrusion of said second mold section.

9. The method according to claim 7, wherein said third laminate is a laminate selected from the group consisting of textile, film, carpet, and vinyl.

10. The method according to claim 7, further comprising overlapping said edge of said third laminate and said second edge of said second laminate upon positioning said second edge of said second laminate and said edge of said third laminate over said recess of said first mold section.

11. The method according to claim 10, wherein said second protrusion of said second mold section pushes said second edge of said second laminate and said edge of said third laminate upon clamping of said first mold section and said second mold section such that said second edge of said second laminate and said edge of said third laminate no longer overlap.

12. The method according to claim 1, wherein said edge of said first laminate is porous and imbeds in said plastic material upon said plastic material being injected into said mold cavity, and wherein said edge of said second laminate is porous and imbeds in said plastic material upon said plastic material being injected into said mold cavity.

13. The method according to claim 7, wherein said edge of said first laminate is porous and imbeds in said plastic material upon said plastic material being injected into said mold cavity, wherein said edge of said second laminate is porous and imbeds in said plastic material upon said plastic material being injected into said mold cavity, wherein said second edge of said second laminate is porous and imbeds in said plastic material upon said plastic material being injected into said mold cavity, and wherein said edge of said third laminate is porous and imbeds in said plastic material upon said plastic material being injected into said mold cavity.

14. A method of injection molding a plastic article comprising the steps of:

a) providing a first mold section having a first recess and a second recess;

b) providing a second mold section having a first protrusion and a second protrusion, said second mold section forming a mold cavity with said first mold section upon said second mold section being clamped with said first mold section, said first protrusion of said second mold section receivable in said first recess of said first mold section upon said second mold section being clamped with said first mold section, said second protrusion of said second mold section receivable in said second recess of said first mold section upon to said second mold section being clamped with said first mold section;

c) providing a first laminate having an edge;

d) providing a second laminate having a first edge and a second edge;

e) providing a third laminate having an edge;

f) positioning said first edge of said second laminate over said first recess and said second edge of said second laminate over said second recess;

g) positioning said edge of said first laminate over said first recess of said first mold section and over said first edge of said second laminate;

h) positioning said edge of said third laminate over said second recess of said first mold section and over said second edge of said second laminate;

i) clamping said first mold section and said second mold section thereby forming said mold cavity, said clamping causing said first protrusion of said second mold section to be received in said first recess of said first mold section and said second protrusion of said second mold section to be received in said second recess of said first mold section, said first protrusion pushing said edge of said first laminate and said first edge of said second laminate into said first recess of said first mold section and said second protrusion pushing said edge of said third laminate and said second edge of said second laminate into said second recess of said first mold section;

h) injecting a plastic material into said mold cavity, wherein said plastic material contacts and becomes at least partially absorbed into at least a portion of said first laminate upon said plastic material being injected into said mold cavity, wherein said plastic material contacts and becomes at least partially absorbed into at least a portion of said second laminate upon said plastic material being injected into said mold cavity, wherein said plastic material contacts and becomes at least partially absorbed into at least a portion of said third laminate upon said plastic material being injected into said mold cavity, wherein said injection causes said first laminate, said second laminate and said third laminate to press against said second mold section, and wherein said injection causes said edge of said first laminate and said first edge of said second laminate to press against said first protrusion of said second mold section and said edge of said third laminate and said second edge of said second laminate to press against said second protrusion of said second mold section;

i) allowing said plastic material to at least partially cure within said mold cavity, said plastic material bonding to said first laminate, said second laminate and said third laminate upon said plastic material at least partially curing;

j) unclamping said first mold section and said second mold section; and k) removing the resulting molded plastic article from said mold cavity.

15. An injection molded plastic article comprising:
a) a plastic member having a ridge;
b) a first laminate having an edge, wherein a first portion of said plastic member is partially absorbed into and is in bonded engagement with at least a portion of said first laminate, wherein said edge of said first laminate is imbedded in said ridge of said side of said plastic member; and
c) a second laminate having an edge, wherein a second portion of said plastic member is partially absorbed into and is in bonded engagement with at least a portion of said second laminate, and wherein said edge of said second laminate is imbedded in said ridge of said side of said plastic member.

16. The injection molded plastic article according to claim 15, wherein said first laminate is a laminate selected from the group consisting of textile, film, carpet, and vinyl.

17. The injection molded plastic article according to claim 15, wherein said second laminate is a laminate selected from the group consisting of textile, film, carpet, and vinyl.

18. The injection molded plastic article according to claim 15, wherein said edge of said first laminate and said edge of said second laminate do not overlap in said ridge of said side of said plastic member.

19. The injection molded plastic article according to claim 15, wherein said side of said plastic member has a second ridge, wherein said second laminate has a second edge, wherein said second edge of said second laminate is imbedded in said second ridge of said side of said plastic member, wherein said injection molded plastic article further comprises a third laminate, wherein a third portion of said plastic member is partially absorbed into and is in bonded relationship with at least a portion of said third laminate, wherein said third laminate has an edge, said edge of said third laminate imbedded in said second ridge of said side of said plastic member.

20. The injection molded plastic article according to claim 15, wherein said third laminate is a laminate selected from the group consisting of textile, film, carpet, and vinyl.

21. The injection molded plastic article according to claim 15, wherein said second edge of said second laminate and said edge of said third laminate do not overlap in said second ridge of said side of said plastic member.

22. The injection molded plastic article according to claim 15, wherein said edge of said first laminate is porous and is imbedded in said ridge of said side of said plastic member, and wherein said edge of said second laminate is porous and is imbedded in said ridge of said side of said plastic member.

23. The injection molded plastic article according to claim 19, wherein said edge of said first laminate is porous and is imbedded in said ridge of said side of said plastic member, wherein said edge of said second laminate is porous and is imbedded in said ridge of said side of said plastic member, wherein said second edge of said second laminate is porous and is imbedded in said second ridge of said side of said plastic member, and wherein said edge of said third laminate is porous and is imbedded in said second ridge of said side of said plastic member.

24. An injection molded plastic article comprising:
a) a plastic member having a first ridge and a second ridge;
b) a first laminate having an edge, wherein a first portion of said plastic member is partially absorbed into and is in bonded engagement with at least a portion of said first laminate, wherein said edge of said first laminate is imbedded in said first ridge of said side of said plastic member;
c) a second laminate having a first edge and a second edge, wherein a second portion of said plastic member is partially absorbed into and is in bonded engagement with at least a portion of said second laminate, wherein said edge of said first laminate is imbedded in said first ridge of said side of said plastic member, wherein said second edge of said second laminate is imbedded in said second ridge of said side of said plastic member, wherein said edge of said first laminate and said first edge of said second laminate do not overlap in said first ridge of said side of said plastic member; and
d) a third laminate having an edge, wherein a third portion of said plastic member is partially absorbed into and is in bonded engagement with at least a portion of said third laminate, wherein said edge of said third laminate is imbedded in said second ridge of said side of said plastic member, and wherein said edge of said third laminate and said second of said second laminate do not overlap in said second ridge of said side of said plastic member.

* * * * *